United States Patent
Fujii

[11] 4,212,517
[45] Jul. 15, 1980

[54] PHOTOGRAPHIC LENS SYSTEM

[75] Inventor: Toru Fujii, Hino, Japan

[73] Assignee: Olympus Optical Company Limited, Tokyo, Japan

[21] Appl. No.: 882,928

[22] Filed: Mar. 2, 1978

[30] Foreign Application Priority Data

Mar. 10, 1977 [JP] Japan ............................ 52-2635177

[51] Int. Cl.$^2$ ............................................. G02B 9/60
[52] U.S. Cl. ................................................... 350/217
[58] Field of Search ..................................... 350/217

[56] References Cited

U.S. PATENT DOCUMENTS 2,735,340  2/1956  Aklin ......................... 350/217 X

FOREIGN PATENT DOCUMENTS 564816  10/1944  United Kingdom ..................... 350/217

Primary Examiner—Paul A. Sacher
Attorney, Agent, or Firm—Cushman, Darby & Cushman

[57] ABSTRACT

A photographic lens system of modified Gauss type comprising a first, second, third fourth and fifth lens components in which the first and second lens components are positive meniscus lenses arranged convex toward the object side, the third lens component is a negative meniscus lens arranged convex toward the object side, the fourth lens component is a negative cemented meniscus doublet comprising a biconcave lens and biconvex lens, the fifth lens component is a biconvex lens, the photographic lens system being compact and light in weight and having a long back focal length and aberrations corrected favorably.

3 Claims, 3 Drawing Figures

PHOTOGRAPHIC LENS SYSTEM

BACKGROUND OF THE INVENTION (a) Field of the Invention

The present invention relates to a modified Gauss type photographic lens system and, more particularly, to a standard photographic lens system which is compact and light in weight.

(b) Description of the Prior Art

For standard photographic lens systems to be used for single-lens reflex cameras, a large aperture ratio and long back focal length are generally required and, therefore, modified Gauss type lens systems are widely used. Known modified Gauss type lens systems, however, have the following disadvantages. That is, when this type of lens system is made small in size, it is unavoidable that flare due to coma, curvature of field, spherical aberration, etc. become unfavourable. When glass materials of high refractive indices are used in order to make aberrations favourable, weight of the lens system increases and, moreover, the cost of materials becomes high.

SUMMARY OF THE INVENTION

It is, therefore, a primary object of the present invention to provide a standard photographic lens system with the aperture ratio of 1.8 and field angle about 45° which is compact and light in weight and, moreover, for which the back focal length is long and aberrations are corrected very favourably.

The photographic lens system according to the present invention has five-component six-element lens configuration as shown in FIG. 1 and comprises a first, second, third, fourth and fifth lens components in which the first lens component $L_1$ is a positive meniscus lens arranged covex toward the object side, the second lens component $L_2$ is also a positive meniscus lens arranged convex toward the object side, the third lens component $L_3$ is a negative meniscus lens arranged convex toward the object side, the fourth lens component $L_4L_5$ is a negative cemented meniscus doublet comprising a biconcave lens $L_4$ with its surface of smaller radius of curvature arranged toward the object side and a biconvex lens $L_5$ with its surface of smaller radius of curvature arranged toward the image side, and the fifth lens component $L_6$ is a biconvex lens with its surface of smaller radius of curvature arranged toward the image side. Besides, the photographic lens system according to the present invention satisfies the following conditions:

(1) $1.67 < n_1, n_2, n_3 < 1.75$
(2) $48 < \nu_1, \nu_2 < 50$
(3) $30 < \nu_3 < 32$
(4) $1.7 < n_5, n_6$
(5) $1.2f < f_1 < 1.3f$
(6) $0.5f < f_{12} < 0.7f$
(7) $2.5f < f_{123} < 4f$
(8) $-0.55f < f_4 < -0.4f$
(9) $0.4f < f_5 < 0.6f$
(10) $0.9f < f_6 < 1.15f$
(11) $4f < r_2 < 5f$
(12) $0.55f < r_4 < 0.7f$
(13) $1.0f < r_5 < 1.2f$
(14) $0.25f < r_6 < 0.3f$
(15) $-0.35f < r_7 < -0.25f$
(16) $2.0f < r_8 < 20f$
(17) $3.5f < r_{10} < 5.0f$
(18) $0.015f < d_4 < 0.02f$
(19) $0.22f < d_6 < 0.26f$
(20) $0.1f < d_3 + d_4 + d_5 < 0.15f$
(21) $0.1f < d_7 + d_8 < 0.15f$
(22) $0.05 < n_5 - n_4 < 0.11$ wherein reference symbol f represents the focal length of the lens system as a whole, reference symbol $f_1$ represents the focal length of the first lens component $L_1$, reference symbols $f_4$ and $f_5$ respectively represent focal lengths of respective lenses $L_4$ and $L_5$ constituting the fourth lens component, reference symbol $f_6$ represents the focal length of the fifth lens component $L_6$, reference symbol $f_{12}$ represents the total focal length of the first lens component $L_1$ and second lens component $L_2$, reference symbol $f_{123}$ represents the total focal length of the first lens component $L_1$, second lens component $L_2$ and third lens component $L_3$, reference symbol $r_2$ represents the radius of curvature of the surface on the image side of the first lens component $L_1$, reference symbol $r_4$ represents the radius of curvature of the surface on the image side of the second lens component $L_2$, reference symbols $r_5$ and $r_6$ respectively represent radii of curvature of respective surfaces of the third lens component $L_3$, reference symbols $r_7$ and $r_8$ respectively represent radii of curvature of the surface on the object side and cemented surface of the fourth lens component $L_4L_5$, reference symbol $r_{10}$ represents the radius of curvature of the surface on the object side of the fifth lens component $L_6$, reference symbol $d_3$ represents the thickness of the second lens component $L_2$, reference symbol $d_4$ represents the airspace between the second lens component $L_2$ and third lens component $L_3$, reference symbol $d_5$ represents the thickness of the third lens component $L_3$, reference symbol $d_6$ represents the airspace between the third lens component $L_3$ and fourth lens component $L_4L_5$, reference symbols $d_7$ and $d_8$ respectively represent thicknesses of respective lenses constituting the fourth lens component $L_4L_5$, reference symbols $n_1$, $n_2$, $n_3$, $n_4$, $n_5$ and $n_6$ respectively represent refractive indices of respective lenses in the order from the object side toward the image side, and $\nu_1$, $\nu_2$ and $\nu_3$ respectively represent Abbe's numbers of the first lens component $L_1$, second lens component $L_2$ and third lens component $L_3$.

Now, meanings of the above conditions are described in detail. The conditions (1) through (4) are established for the purpose of reducing Petzval's sum and correcting chromatic aberration favourably and relate to refractive indices and Abbe's numbers of respective lenses. If refractive index $n_1$ of the first lens component $L_1$ and/or refractive index $n_2$ of the second lens component $L_2$ becomes larger than the upper limit of the condition (1), it becomes necessary to use glass of high dispersion and high refractive index though Petzval's sum becomes favourable. If such glass is used for the first lens component $L_1$ and/or second lens component $L_2$ for which the lens diameter is large, weight of the lens system as a whole increases. If refractive index $n_3$ of the third lens component $L_3$ becomes larger than the upper limit of the condition (1), weight of the lens system as a whole and Petzval's sum increase. If refractive index $n_1$ and/or refractive index $n_2$ becomes smaller than the lower limit of the condition (1), Petzval's sum increases and, at the same time, spherical aberration will be undercorrected. If refractive index $n_3$ becomes smaller than the lower limit of the condition (1), it becomes necessary to reduce the radius of curvature $r_6$ of the surface on the image side of the third lens component $L_3$. As a result, flare increases and, at the same time, spherical aberration will be overcorrected.

The condition (2) is to limit chromatic aberration to be caused by lens components $L_1$ and $L_2$. If Abbe's number $\nu_1$ or $\nu_2$ of these lens components becomes smaller than the lower limit of the condition (2), paraxial chromatic aberration will be undercorrected. If Abbe's number $\nu_1$ or $\nu_2$ becomes larger than the upper limit of the condition (2), it becomes necessary to use glass of high price in order to satisfy the condition (1) and, consequently, weight of the lens system also increases.

The condition (3) is to correct chromatic aberration by the third lens component $L_3$ when dispersion of the lens components $L_1$ and $L_2$ is defined as above by the condition (2). As it is possible to correct chromatic aberration favourably by the lens component $L_3$ even when its Abbe's number $\nu_3$ is comparatively large, it is possible to use glass of flint glass group with light weight for the lens component $L_3$. If Abbe's number $\nu_3$ becomes smaller than the lower limit of the condition (3), paraxial chromatic aberration will be overcorrected. If Abbe's number $\nu_3$ becomes larger than the upper limit, paraxial chromatic aberration will be undercorrected.

The condition (4) is to make Petzval's sum small and defines the lower limit of refractive indices $n_5$ and $n_6$ of lenses $L_5$ and $L_6$. It is desirable to make refractive indices $n_5$ and $n_6$ as large as possible. If $n_5$ and/or $n_6$ becomes smaller than the lower limit of the condition (4), it becomes impossible to keep Petzval's sum small. As it is possible to make diameters and thicknesses of lenses $L_5$ and $L_6$ comparatively small, weight of these lenses does not become so large even when glass materials of high refractive indices are used.

The condition (5) relates to correction of spherical aberration. If the focal length $f_1$ of the lens component $L_1$ becomes larger than the upper limit of the condition (5), spherical aberration will be overcorrected. If the focal length $f_1$ becomes smaller than the lower limit, spherical aberration will be considerably undercorrected and correction of spherical aberration becomes unsatisfactory for a lens system of Fl. 8 class.

The conditions (6) and (7) are required, together with the condition (20), for arranging the lens system compactly and for obtaining a long back focal length. If the total focal length $f_{12}$ of the lens components $L_1$ and $L_2$ becomes larger than the upper limit of the condition (6), the overall length of the lens system becomes long though it is advantageous for making the back focal length long. If the total focal length $f_{12}$ becomes smaller than the lower limit of the condition (6), coma of offaxial lower rays occurs inevitably. If the total focal length $f_{123}$ of the lens components $L_1$, $L_2$ and $L_3$ becomes larger than the upper limit of the condition (7), positive spherical aberration and coma to be caused by the surface $r_7$ on the object side of the fourth lens component occur inevitably though it is possible to make the back focal length long. If the total focal length $f_{123}$ becomes smaller than the lower limit of the condition (7), the back focal length becomes too short and it is unsatisfactory for a lens system for a single-lens reflex camera.

The conditions (8), (9) and (10) relate, together with the conditions (16) and (22), to offaxial field curvature and offaxial chromatic aberration. If the focal length $f_4$ of the lens $L_4$ becomes larger than the upper limit of the condition (8) or the focal length $f_5$ of the lens $L_5$ becomes smaller than the lower limit of the condition (9), flatness of offaxial field will be disturbed. If, on the contrary, the focal length $f_4$ becomes smaller than the lower limit of the condition (8) or focal length $f_5$ becomes larger than the upper limit of the condition (9), flare due to coma will increase and, at the same time, spherical aberration will be overcorrected. The condition (10) is effective for correction of spherical aberration and offaxial coma. If the focal length $f_6$ of the lens component $L_6$ becomes smaller than the lower limit of the condition (10), coma of offaxial upper rays will increase. If the focal length $f_6$ becomes larger than the upper limit of the condition (10), spherical aberration will be overcorrected.

The condition (11) relates particularly to distortion and coma of offaxial lower rays and defines the range of the radius of curvature $r_2$ of the surface on the image side of the lens component $L_1$. If the radius of curvature $r_2$ becomes smaller than the lower limit of the condition (11), negative distortion will inevitably increase and spherical aberration will be undercorrected. If the radius of curvature $r_2$ becomes larger than the upper limit of the condition (11), coma of offaxial lower rays will increase excessively.

The conditions (12) and (13) are to define the ranges of the radius of curvature $r_4$ of the surface on the image side of the lens component $L_2$ and radius of curvature $r_5$ of the surface on the object side of the lens component $L_3$ which are especially important for attaining symmetry of coma. If the radius of curvature $r_4$ becomes smaller than the lower limit of the condition (12) or the radius of curvature $r_5$ becomes smaller than the lower limit of the condition (13), flare due to coma of lower rays near the center of field will be caused. If the radius of curvature $r_4$ becomes larger than the upper limit of the condition (12) or radius of curvature $r_5$ becomes larger than the upper limit of the condition (13), offaxial coma of rays of high field angle will increase extremely.

The conditions (14) and (15) relate to radii of curvature $r_6$ and $r_7$ of surfaces with small radii of curvature located on both sides of the stop. If the radius of curvature $r_6$ becomes smaller than the lower limit of the condition (14) or radius of curvature $r_7$ becomes larger than the upper limit of the condition (15), flare by sagittal rays will increase though it is possible to make Petzval's sum small. If, on the contrary, the radius of curvature $r_6$ becomes larger than the upper limit of the condition (14) of radius of curvature $r_7$ becomes smaller than the lower limit of the condition (15), it becomes impossible to favourably correct asymmetry of coma unless the overall length of the lens system is made long.

The condition (16) is to correct longitudinal chromatic aberration in well-balanced state. If the radius of curvature $r_8$ of the cemented surface of the fourth lens component becomes larger than the upper limit of the condition (16), both of longitudinal chromatic aberration and lateral chromatic aberration become negative values of large absolute values because it is necessary to satisfy the condition (22) to be described later and, consequently, it becomes impossible to favourably correct them by the lenses $L_5$ and $L_6$. If the radius of curvature $r_8$ becomes smaller than the lower limit of the condition (22), negative distortion becomes large and, at the same time, the back focal length becomes short.

The condition (17) is to limit distortion and to make the back focal length long. If the radius of curvature $r_{10}$ of the surface on the object side of the fifth lens component becomes smaller than the lower limit of the condition (17), negative distortion increases and back focal length becomes short. If the radius of curvature $r_{10}$ becomes larger than the upper limit of the condition (17), coma at large field angle becomes unfavourable.

The condition (18) relates to balance of coma at portions of large field angle and small field angle together with the conditions (12) and (13). If the airspace $d_4$ between the second and third lens components becomes smaller than the lower limit of the condition (18), it becomes difficult to correct the sine condition favourably and flare due to coma occurs at the portion near the center of field. If the airspace $d_4$ becomes larger than the upper limit of the condition (18), coma of lower rays at large field angles becomes unfavourable.

The condition (19) is to make Petzval's sum small and to prevent asymmetry of coma. To make the lens system compact as in case of the lens system according to the present invention, it is essential that the airspace $d_6$ between the third and fourth lens components does not become larger than the upper limit of the condition (19). If the airspace $d_6$ becomes larger than the upper limit, Petzval's sum becomes larger and it becomes difficult to correct spherical aberration favourably because the conditions (14) and (15) should be satisfied. If the airspace $d_6$ becomes smaller than the lower limit of the condition (19), asymmetry of coma occurs and it becomes impossible to favourably correct it by other portions.

The conditions (20) and (21) are required for the purpose of making the lens system as a whole compact and back focal length long. If $d_3+d_4+d_5$ becomes larger than the upper limit of the condition (20) or $d_7+d_8$ becomes larger than the upper limit of the condition (21), the back focal length becomes short and it is unsatisfactory for a lens system for a single-lens reflex camera. If $d_3+d_4+d_5$ becomes smaller than the lower limit of the condition (20) or $d_7+d_8$ becomes smaller than the lower limit of the condition (21), offaxial field curvature becomes negative value of large absolute value and spherical aberration of positive value occurs. Consequently, it becomes difficult to obtain a well-balanced image.

The condition (22) relates to correction of spherical aberration and offaxial chromatic aberration. If the difference $n_5-n_4$ between refractive indices of lenses $L_4$ and $L_5$ constituting the fourth lens component becomes smaller than the lower limit of the condition (22), Petzval's sum increases and, at the same time, spherical aberration will be overcorrected. If $n_5-n_4$ becomes larger than the upper limit of the condition (22), offaxial coma of spectrum increases though it is possible to make Petzval's sum and curvature of field small.

As explained in the above, by satisfying the respective conditions described in the above, it is possible to provide a modified Gauss type photographic lens system which is compact and light in weight and for which the back focal length is long and aberrations are corrected favourably.

DETAILED DESCRIPTION OF THE PREFERRED EMBODIMENTS

Figure 1:
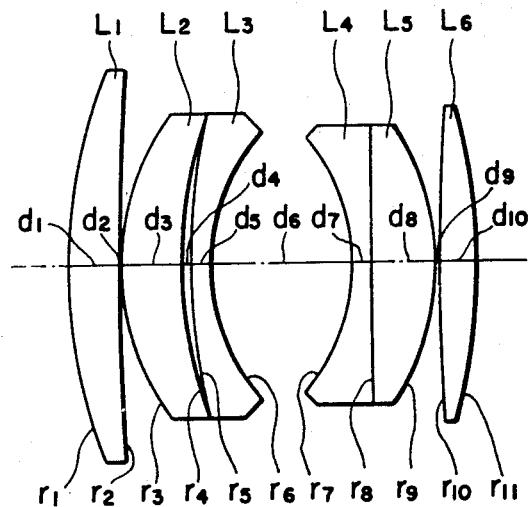
FIG. 1 shows a sectional view of the photographic lens system according to the present invention.
Figure 2:
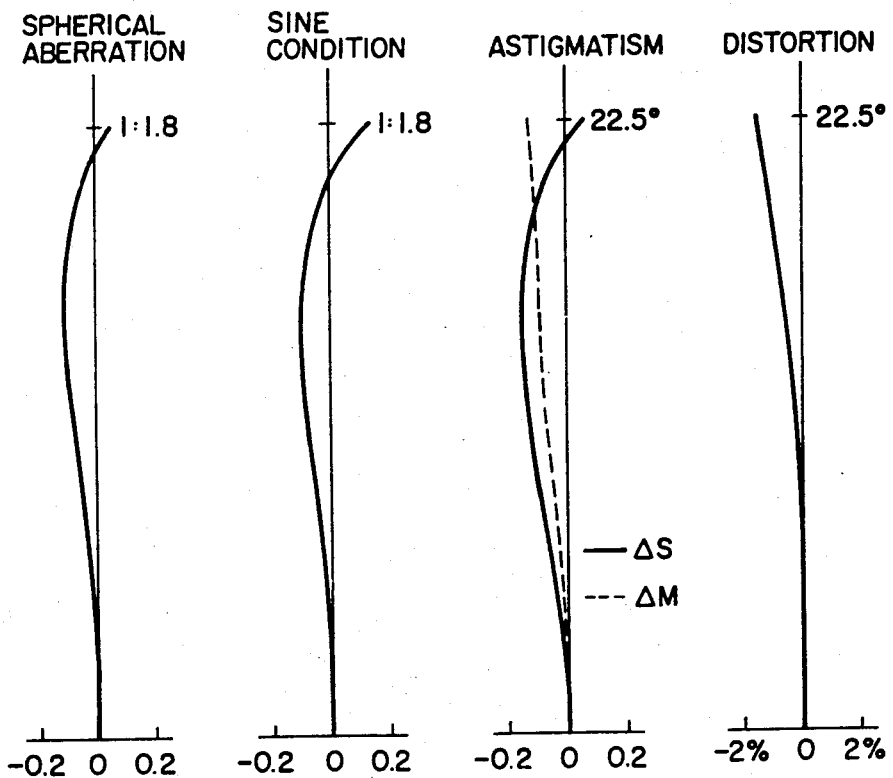
FIG. 2 shows graphs illustrating aberration curves of Embodiment 1 of the present invention.
Figure 3:
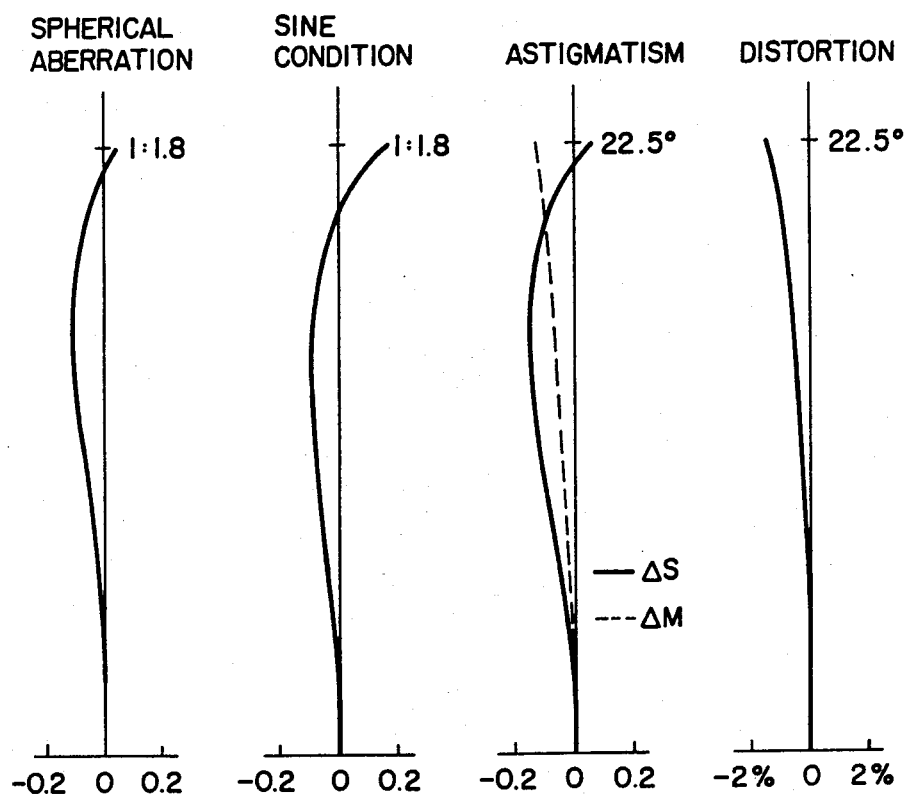
FIG. 3 shows graphs illustrating aberration curves of Embodiment 2 of the present invention.

Preferred embodiments of the photographic lens system according to the present invention explained in the above are as shown below.

Embodiment 1

$f = 100 \quad 2\omega = 45°$
$r_1 = 72.685$
$d_1 = 8.22 \quad n_1 = 1.7 \quad \nu_1 = 48.08$
$r_2 = 436.925$
$d_2 = 0.54$
$r_3 = 40.448$
$d_3 = 9.65 \quad n_2 = 1.7 \quad \nu_2 = 48.08$
$r_4 = 67.381$
$d_4 = 1.87$
$r_5 = 111.285$
$d_5 = 2.90 \quad n_3 = 1.69895 \quad \nu_3 = 30.12$
$r_6 = 29.294$
$d_6 = 23.36$
$r_7 = -30.410$
$d_7 = 2.28 \quad n_4 = 1.61293 \quad \nu_4 = 37$
$r_8 = 283.363$
$d_8 = 10.91 \quad n_5 = 1.713 \quad \nu_5 = 53.9$
$r_9 = -40.666$
$d_9 = 0.35$
$r_{10} = 469.110$
$d_{10} = 5.79 \quad n_6 = 1.713 \quad \nu_6 = 53.9$
$r_{11} = -90.482$
$f_1 = 123.4 \quad \Sigma d = 56.65$
$f_{12} = 62.1 \quad fB = 72.97$
$f_{123} = 306.2$
$f_4 = -44.7$
$f_5 = 50.6$
$f_6 = 106.8$ Embodiment 2

$f = 100 \quad 2\omega = 45°$
$r_1 = 72.373$
$d_1 = 8.22 \quad n_1 = 1.697 \quad \nu_1 = 48.5$
$r_2 = 445.564$
$d_2 = 0.56$
$r_3 = 40.682$
$d_3 = 9.77 \quad n_2 = 1.697 \quad \nu_2 = 48.5$
$r_4 = 67.141$
$d_4 = 1.80$
$r_5 = 112.005$
$d_5 = 2.32 \quad n_3 = 1.68893 \quad \nu_3 = 31.1$
$r_6 = 29.438$
$d_6 = 24.89$
$r_7 = -29.805$
$d_7 = 2.28 \quad n_4 = 1.62588 \quad \nu_4 = 35.7$
$r_8 = 1888.468$
$d_8 = 10.91 \quad n_5 = 1.713 \quad \nu_5 = 53.9$
$r_9 = -38.906$
$d_9 = 0.35$
$r_{10} = 395.345$
$d_{10} = 5.79 \quad n_6 = 1.713 \quad \nu_6 = 53.9$
$r_{11} = -93.520$
$f_1 = 122.9 \quad \Sigma d = 66.89$
$f_{12} = 62.5 \quad fB = 73.94$
$f_{123} = 310.5$
$f_4 = -46.9$
$f_5 = 53.6$
$f_6 = 106.6$ In the above embodiments, reference symbols $r_1$ through $r_{11}$ respectively represent radii of curvature of respective lens surfaces, reference symbols $d_1$ through $d_{10}$ respectively represent thicknesses of respective lenses and airspaces between respective lenses, reference symbols $n_1$ through $n_6$ respectively represent refractive indices of respective lenses, reference symbols $\nu_1$ through $\nu_6$ respectively represent Abbe's numbers of respective lenses, reference symbol $\Sigma d$ represents the overall length of the lens system and reference symbol $f_B$ represents the back focal length of the lens system.

As it is evident from the above embodiments, the photographic lens system according to the present invention has a long back focal length of 0.7f or more and short overall length $\Sigma d$ and, moreover, the weight of the lens system is small because glass materials of comparatively low refractive indices are used. Besides, as it is evident from graphs of aberrations curves, aberrations of the lens system according to the present invention are corrected favourably.

I claim:

1. A photographic lens system comprising a first, second, third, fourth and fifth lens components, said first lens component being a positive meniscus lens arranged convex toward the object side, said second lens component being a positive meniscus lens arranged convex toward the object side, said third lens component being a negative meniscus lens arranged convex toward the object side, said fourth lens component being a negative cemented meniscus doublet comprising a biconcave lens with its surface of smaller radius of curvature arranged toward the object side and a biconvex lens with its surface of smaller radius of curvature arranged toward the image side, said fifth lens component being a biconvex lens with its surface of smaller radius of curvature arranged toward the image side, said photographic lens system satisfying the following conditions:

(1) $1.69 < n_1, n_2 < 1.75 \ 1.68 < n_3 < 1.70$
(2) $48 < \nu_1, \nu_2 < 50$
(3) $30 < \nu_3 < 32$
(4) $n_5, n_6 = 1.713$
(5) $1.2f < f_1 < 1.3f$
(6) $0.62f < f_{12} < 0.63f$
(7) $3f < f_{123} < 3.2f$
(8) $-0.47f < f_4 < -0.44f$
(9) $0.5f < f_5 < 0.6f$
(10) $1.06f < f_6 < 1.07f$
(11) $4f < r_2 < 4.5f$
(12) $0.67f < r_4 < 0.7f$
(13) $1.0f < r_5 < 1.2f$
(14) $0.29f < r_6 < 0.3f$
(15) $-0.35f < r_7 < -0.29f$
(16) $3.9f < r_{10} < 4.7f$
(17) $0.017f < d_4 < 0.02f$
(18) $0.23f < d_6 < 0.25f$
(19) $0.13f < d_3 + d_4 + d_5 < 0.15f$
(20) $d_7 + d_8 = 0.1319f$
(21) $0.08 < n_5 - n_4 < 0.11$ wherein reference symbol $f$ represents the focal length of the lens system as a whole, reference symbol $f_1$ represents the focal length of the first lens component, reference symbols $f_4$ and $f_5$ respectively represent focal lengths of respective lenses constituting the fourth lens component, reference symbol $f_6$ represents the focal length of the fifth lens component, reference symbol $f_{12}$ represents the total focal length of the first and second lens components, reference symbol $f_{123}$ represents the total focal length of the first, second and third lens components, reference symbol $r_2$ represents the radius of curvature of the surface on the image side of the first lens component, reference symbol $r_4$ represents the radius of curvature of the surface on the image side of the second lens component, reference symbols $r_5$ and $r_6$ respectively represent radii of curvature of respective surfaces of the third lens component, reference symbols $r_7$ and $r_8$ respectively represent radii of curvature of the surface on the object side and cemented surface of the fourth lens component, reference symbol $r_{10}$ represents the radius of curvature of the surface on the object side of the fifth lens component, reference symbol $d_4$ represents the airspace between the second and third lens components, reference symbol $d_6$ represents the airspace between the third and fourth lens components, reference symbol $(d_3 + d_4 + d_5)$ represents the distance from the surface on the object side of the second lens component to the surface on the image side of the third lens component, reference symbol $(d_7 + d_8)$ represents the thickness of the fourth lens component, and reference symbols $n_1, n_2, n_3, n_4, n_5$ and $n_6$ respectively represent refractive indices of respective lenses in the order from the object side toward the image side, and $\nu_1, \nu_2$ and $\nu_3$ respectively represent Abbe's numbers of the first, second and third lens components.

2. A photographic lens system according to claim 1, in which said photographic lens system has the following numerical data:

| | $f = 100$ | $2\omega = 45°$ | |
|---|---|---|---|
| $r_1 = 72.685$ | | | |
| | $d_1 = 8.22$ | $n_1 = 1.7$ | $\nu_1 = 48.08$ |
| $r_2 = 436.925$ | | | |
| | $d_2 = 0.54$ | | |
| $r_3 = 40.448$ | | | |
| | $d_3 = 9.65$ | $n_2 = 1.7$ | $\nu_2 = 48.08$ |
| $r_4 = 67.381$ | | | |
| | $d_4 = 1.87$ | | |
| $r_5 = 111.285$ | | | |
| | $d_5 = 2.90$ | $n_3 = 1.69895$ | $\nu_3 = 30.12$ |
| $r_6 = 29.294$ | | | |
| | $d_6 = 23.36$ | | |
| $r_7 = -30.410$ | | | |
| | $d_7 = 2.28$ | $n_4 = 1.61293$ | $\nu_4 = 37$ |
| $r_8 = 283.363$ | | | |
| | $d_8 = 10.91$ | $n_5 = 1.713$ | $\nu_5 = 53.9$ |
| $r_9 = -40.666$ | | | |
| | $d_9 = 0.35$ | | |
| $r_{10} = 469.110$ | | | |
| | $d_{10} = 5.79$ | $n_6 = 1.713$ | $\nu_6 = 53.9$ |
| $r_{11} = -90.482$ | | | |
| | $f_1 = 123.4$ | $\Sigma d = 56.65$ | |
| | $f_{12} = 62.1$ | $f_B = 72.97$ | |
| | $f_{123} = 306.2$ | | |
| | $f_4 = -44.7$ | | |
| | $f_5 = 50.6$ | | |
| | $f_6 = 106.8$ | | | wherein reference symbols $r_1$ through $r_{11}$ respectively represent radii of curvature of respective lens surfaces, reference symbols $d_1$ through $d_{10}$ respectively represent thicknesses of respective lenses and airspaces between respective lenses, reference symbols $n_1$ through $n_6$ respectively represent refractive indices of respective lenses, reference symbols $\nu_1$ through $\nu_6$ respectively represent Abbe's numbers of respective lenses, reference symbol $f$ represents the focal length of the lens system as a whole, reference symbol $f_1$ represents the focal length of the first lens component, reference symbol $f_{12}$ represents the total focal length of the first and second lens components, reference symbol $f_{123}$ represents the total focal length of the first, second and third lens components, reference symbol $f_4$ represents the focal length of the lens on the object side in the fourth lens component, reference symbol $f_5$ represents the lens on the image side in the fourth lens component, reference symbol $f_6$ represents the focal length of the fifth lens component, reference symbol $\Sigma d$ represents the overall length of the lens system and reference symbol $f_B$ represents the back focal length of the lens system.

3. A photographic lens system according to claim 1, in which said photographic lens system has the following numerical data:

| | f = 100 | | 2ω = 45° |
|---|---|---|---|
| $r_1 = 72.373$ | | | |
| | $d_1 = 8.22$ | $n_1 = 1.697$ | $v_1 = 48.5$ |
| $r_2 = 445.564$ | | | |
| | $d_2 = 0.56$ | | |
| $r_3 = 40.682$ | | | |
| | $d_3 = 9.77$ | $n_2 = 1.697$ | $v_2 = 48.5$ |
| $r_4 = 67.141$ | | | |
| | $d_4 = 1.80$ | | |
| $r_5 = 112.005$ | | | |
| | $d_5 = 2.32$ | $n_3 = 1.68893$ | $v_3 = 31.1$ |
| $r_6 = 29.438$ | | | |
| | $d_6 = 24.89$ | | |
| $r_7 = -29.805$ | | | |
| | $d_7 = 2.28$ | $n_4 = 1.62588$ | $v_4 = 35.7$ |
| $r_8 = 1888.468$ | | | |
| | $d_8 = 10.91$ | $n_5 = 1.713$ | $v_5 = 53.9$ |
| $r_9 = -38.906$ | | | |
| | $d_9 = 0.35$ | | |
| $r_{10} = 395.345$ | | | |
| | $d_{10} = 5.79$ | $n_6 = 1.713$ | $v_6 = 53.9$ |
| $r_{11} = -93.520$ | | | |
| | $f_1 = 122.9$ | $\Sigma d = 66.89$ | |
| | $f_{12} = 62.5$ | $f_B = 73.94$ | |
| | $f_{123} = 310.5$ | | |
| | $f_4 = -46.9$ | | |
| | $f_5 = 53.6$ | | |
| | $f_6 = 0\ 106.6$ | | | wherein reference symbols $r_1$ through $r_{11}$ respectively represent radii of curvature of respective lens surfaces, reference symbols $d_1$ through $d_{10}$ respectively represent thicknesses of respective lenses and airspaces between respective lenses, reference symbols $n_1$ through $n_6$ respectively represent refractive indices of respective lenses, reference symbols $v_1$ through $v_6$ respectively represent Abbe's numbers of respective lenses, reference symbol f represents the focal length of the lens system as a whole, reference symbol $f_1$ represents the focal length of the first lens component, reference symbol $f_{12}$ represents the total focal length of the first and second lens components, reference symbol $f_{123}$ represents the total focal length of the first, second and third lens components, reference symbol $f_4$ represents the focal length of the lens on the object side in the fourth lens component, reference symbol $f_5$ represents the lens on the image side in the fourth lens component, reference symbol $f_6$ represents the focal length of the fifth lens component, reference symbol $\Sigma d$ represents the overall length of the lens system and reference symbol $f_B$ represents the back focal length of the lens system.

* * * * *